US012701136B2

(12) United States Patent
Monheimer et al.

(10) Patent No.: US 12,701,136 B2
(45) Date of Patent: Aug. 4, 2026

(54) ARTIFICIAL INTELLIGENCE BASED ELECTRONIC MAIL CLASSIFICATION

(71) Applicant: MASTERCARD INTERNATIONAL INCORPORATED, Purchase, NY (US)

(72) Inventors: Noa Monheimer, Snohomish, WA (US); Adrienn Juhasz, Budapest (HU)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 19 days.

(21) Appl. No.: 18/751,026

(22) Filed: Jun. 21, 2024

(65) Prior Publication Data

US 2025/0392615 A1      Dec. 25, 2025

(51) Int. Cl.
*H04L 9/40* (2022.01)
*G06N 20/20* (2019.01)

(52) U.S. Cl.
CPC ......... *H04L 63/1441* (2013.01); *G06N 20/20* (2019.01); *H04L 63/1416* (2013.01)

(58) Field of Classification Search
CPC .. H04L 63/1441; H04L 63/1416; G06N 20/20
See application file for complete search history.

(56) References Cited

U.S. PATENT DOCUMENTS

| | | | | | |
|---|---|---|---|---|---|
| 7,818,219 | B2 * | 10/2010 | Klivington | ............. | G06Q 50/16 |
| | | | | | 705/26.1 |
| 11,895,034 | B1 * | 2/2024 | Yoskowitz | .......... | H04L 63/1425 |
| 12,314,441 | B1 * | 5/2025 | Shah | ...................... | G06N 20/00 |
| 2003/0023736 | A1 * | 1/2003 | Abkemeier | .......... | G06Q 10/107 |
| | | | | | 709/229 |

(Continued)

FOREIGN PATENT DOCUMENTS

| | | | | | |
|---|---|---|---|---|---|
| KR | | 2016095833 | A * | 8/2016 | ............. G06Q 50/32 |

OTHER PUBLICATIONS

Lexisnexis, "Use Email Intelligence for Powerful Online Fraud Risk Scoring", accessed Jun. 21, 2024 at https://risk.lexisnexis.com/products/lexisnexis-emailage, pp. 1-3.

*Primary Examiner* — Richard G Keehn
(74) *Attorney, Agent, or Firm* — Pillsbury Winthrop Shaw Pittman LLP

(57)      ABSTRACT

The disclosure relates to methods and systems of email address classification. A system may generate features based on an email address. The features may include an identity-graph based feature that indicates a number of identity data points associated with the email address, an email tumbling based feature that indicates whether the email address has been tumbled, and a feature that indicates a recency of a domain associated with the email address. The system may vectorize the plurality of features to generate a feature vector. The system may execute, based on the feature vector, an email classification model comprising an ensemble machine learning model trained to classify email addresses according to the plurality of features of email addresses in training data and classification labels associated with the email addresses. The system may determine, based on execution of the email classification model, a classification of the email address.

20 Claims, 7 Drawing Sheets

(56) References Cited

U.S. PATENT DOCUMENTS

| | | | | |
|---|---|---|---|---|
| 2004/0221016 A1* | 11/2004 | Hatch | .................. | H04L 51/212 |
| | | | | 709/207 |
| 2017/0302783 A1* | 10/2017 | Tanabe | .................. | G06F 3/0346 |
| 2018/0336495 A1* | 11/2018 | Chestnut | ................ | G06N 20/20 |
| 2021/0168161 A1* | 6/2021 | Dunn | ..................... | G06N 20/00 |
| 2022/0215067 A1* | 7/2022 | Shetty | ................... | G06N 20/00 |
| 2024/0242104 A1* | 7/2024 | Abhyankar | ........... | G06F 40/166 |
| 2024/0378586 A1* | 11/2024 | Vu | ....................... | G06Q 20/401 |
| 2025/0245656 A1* | 7/2025 | Wang | .................. | G06Q 10/107 |

* cited by examiner

*200*

400

Access an electronic mail (email) address
402

Generate a plurality of features based on the email address, the plurality of features comprising an identity-graph based feature that indicates a number of identity data points associated with the email address, an email tumbling based feature that indicates whether the email address has been tumbled, and a domain-based feature that indicates a recency of a domain associated with the email address
404

Vectorize the plurality of features to generate a feature vector
406

Execute, based on the feature vector, an email classification model comprising an ensemble machine learning model trained to classify email addresses according to the plurality of features of email addresses in training data and classification labels associated with the email addresses
408

Eetermine, based on execution of the email classification model, a classification of the email address, the classification being actionable to take a remedial action responsive to the classification
410

Access training data comprising a plurality of electronic mail (email) addresses, each email address being associated with a respective label that indicates a class to which the email address belongs
502

Rebalance the training data based on a domain and a data source associated with each of the plurality of email addresses
504

Determine a threshold value for each of one or more features
506

Identify a plurality of candidate features based on the rebalanced training data
508

Train a plurality of Release Candidate (RC) models based on the plurality of features, wherein each RC model is trained to classify an email address into a class corresponding to a respective label
510

ARTIFICIAL INTELLIGENCE BASED ELECTRONIC MAIL CLASSIFICATION

BACKGROUND

Electronic identities may be compromised or obfuscated for various types of malicious activity, from network intrusion to identity theft and other fraudulent activity. A common electronic identifier is an electronic mail (email) address. Email addresses have become a widespread way to identify a user in part because they are relatively easy to create and can be useful for various information security validation procedures such as multi-factor authentication. However, because of its popularity, email addresses are being created for malicious uses at scale.

BRIEF DESCRIPTION OF THE DRAWINGS

Features of the present disclosure may be illustrated by way of example and not limited in the following figure(s), in which like numerals indicate like elements, in which:

FIG. 4 illustrates an example of a method of generating an email classification;

FIG. 5 illustrates an example of a method of training an email classification model;

DETAILED DESCRIPTION

Figure 1:
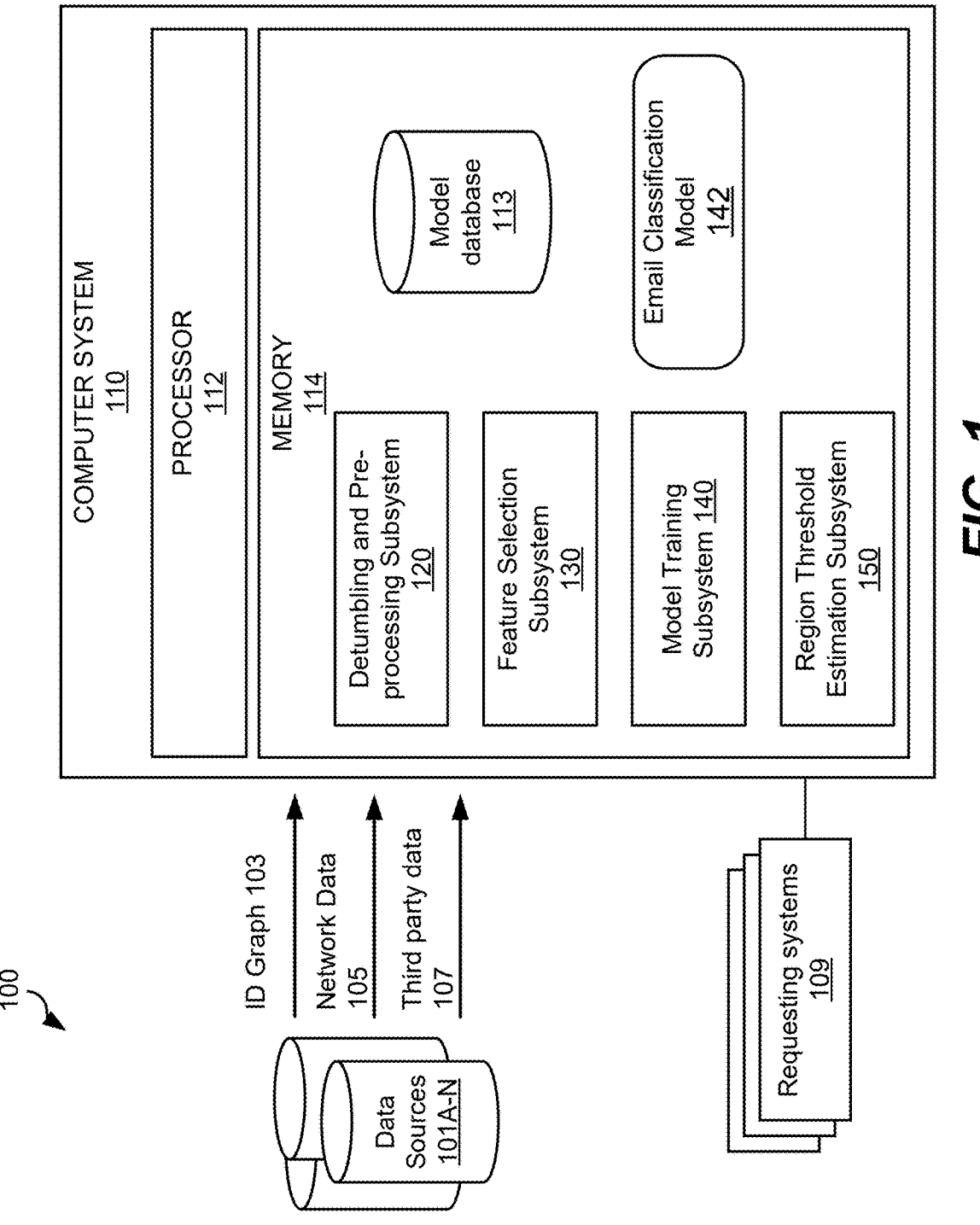
FIG. 1 illustrates an example of a system environment of training, re-training, and activating machine learning models for classifying email addresses.

The disclosure relates to methods and systems of training, retraining and executing machine learning models to classify electronic identifiers such as email addresses to detect potential misuse. Email addresses may be used for electronic identity in various contexts, such as for identity checks, transaction risk assessment, account opening, promotion abuse, and/or other contexts. For example, in an identity checking context, email addresses may be used to verify a user's identity, which may include bot detection in which a computer program may impersonate a human user. In a transaction risk assessment, an email address may be used as part of a data record to assess the riskiness (such as risk of malicious activity such as fraud). In account opening contexts, an email address may be used to verify that a valid way to communicate with an account holder has been entered.

A malicious actor may create or use an email address for illegitimate purposes in these and other contexts. In particular, malicious actors may use sophisticated techniques to hide their true identities, including email address tumbling, private relays for network communications, and other techniques that can make it difficult to identify an underlying real user. To address these threats, the age of an email address may be used to predict risk. For example, the first and/or last time an email address was seen may indicate its riskiness.

However, these signals may not reflect an email's riskiness because they may fail to capture risk factors such as email tumbling/obfuscation, email domain reputation, regional risk factors, and/or other risks. Furthermore, because email data may originate from third parties, such email data may become incomplete if data providers are changed or otherwise stop providing the email data.

To address these and other issues with email obfuscation, a system may identify features for training machine learning models to classify email addresses in training data that is labeled according to risk classes. The email addresses in the training data may be known to be associated with risk, such as having been used in connection with known malicious activity. The system may improve machine learning models to generate classifications based on the identified features that demonstrate predictive outcomes. The features may be identified based on identity graphs, email tumbling detection and detumbling to identify a mailbox feature that adds a new dimension in network history data, sampling/rebalancing email domains, improving performance for obfuscated emails using private relays, determining the ideal number of days for when an email is considered "recent", and hyperparameter tuning. Once the features are selected, hyperparameters may be tuned, such as to mitigate against bias by adjusting the learning rate. Doing so may, for example, reduce overfitting or otherwise address data issues that can lead to bias. After feature selection and hyperparameter tuning, the machine learning models may be used to classify input email addresses for mitigation. The classifications may be evaluated against thresholds that are dynamically adjusted based on regional nuances and anomalies to ensure the model performs well globally.

Having described an overview of examples of operation of the detecting anomalies, attention will now turn to an example of a system environment in which the machine learning models are trained and used. FIG. 1 illustrates an example of a system environment 100 of training, re-training, and activating machine learning models for classifying email addresses. The system environment 100 may include one or more data sources 101A-N, a computer system 110, one or more requesting systems 109, and/or other components. At least some of the components of the system environment 100 may be connected to one another via a communication network, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 100 components may communicate.

The data sources 101A-N may provide data used to train and retrain email classification models 142. The data may be associated with data records that indicate illegitimate activity such as malicious activity (including fraud), bot activity intended to bypass security controls, and/or other illegitimate activity. In particular examples, the data may include payment transaction records for payment transactions. Declined transactions based on fraud, transactions later found to be fraudulent, or other illegitimate activity may indicate that email addresses associated with those transactions are risky. The system may improve machine learning models to identify features that correlate with this risk, and train and use machine learning models to classify email addresses based on the identified features.

For example, the data sources 101A-N may provide data that is converted into features for training and executing an email classification model 142. Data provided by each source 101 may be stored in association with a data source identifier (ID). The data sources 101A-N may provide an identity graph 103, network history data 105, third party data 107, and/or other types of data that can be used as features for training and executing an email classification model 142.

The identity graph 103 may store linkages between an email address and identifying information such as a name, a phone number, and/or other data that can be used to identify a user. Using the identity graph 103, for example, the number of users that use a given email address may be determined. The network history data 105 may include transaction data, such as purchase transactions linked with an email address. Various types of network-based features may be generated, such as the number of times a given domain has been seen in a given time period, such as in the last 30, 60, 90, or other number of days or durations. The third party data 107 may include data from third parties that include email addresses and any information known about the email addresses.

The computer system 110 may include one or more computing devices that generate a risk classification for an email address. For example, the one or more computing devices of the computer system 110 may each include a processor 112, a memory 114, a detumbling and pre-processing subsystem 120, a feature selection subsystem 130, a model training subsystem 140, a region threshold estimation subsystem 150, and/or other components.

The processor 112 may be a semiconductor-based microprocessor, a central processing unit (CPU), an application specific integrated circuit (ASIC), a field-programmable gate array (FPGA), and/or other suitable hardware device. Although the computer system 110 has been depicted as including a single processor 112, it should be understood that the computer system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals. The feature selection subsystem 130, and the region threshold estimation subsystem 150 may each be implemented as instructions that program the processor 112. Alternatively, or additionally, the feature selection subsystem 130, the model training subsystem 140, and the region threshold estimation subsystem 150 may each be implemented in hardware.

The detumbling and pre-processing subsystem 120 may pre-process email addresses for training and/or activating the email classification model 142. Pre-processing may include detumbling, whitespace removal, and/or other processing on an email address. Some email addresses may be tumbled in an effort to obfuscate underlying email accounts.

De-Tumbling

Tumbling when used legitimately is a process in which one or more tumbling characters are added to an email address to enable email filtering processes without affecting the recipient address. The tumbling characters may include symbols or characters that are reserved by an email server for tumbling processes. For example, alias tumbling may include generating email alias such as by adding a "+" character followed by one or more other characters before the "[at]" symbol of an email address. Other types and placement of tumbling characters may be used as well or instead. For example, dot tumbling involves adding characters such as periods, or dots ("."), in the email address for a similar effect. The existence of symbols or characters enable the user to specify, for example, that certain tumbled email addresses are to be filtered out (deleted), filtered into organized folders, or some other email handling function. For example, an email address "johndoe[at]domain[dot]com" includes a recipient account portion ("johndoe") and a domain portion ("domain[dot]com").

This email address may be alias tumbled. To illustrate, three examples follow: "johndoe+1[at]domain[dot]com"; "johndoe+2[at]domain[dot]com"; and "johndoe+3[at]domain[dot]com". The tumbling character "+" and the characters that follow (1-3 in the foregoing three examples) enable the email server to filter messages or perform other email handling according to the tumbling character and characters that follow. For example, "+1" may be automatically removed as spam, "+2" may be routed to a specific folder and "+3" may be routed to another folder. Alternatively, or additionally, the email address may be dot tumbled by adding a ".", such as "john.doe[at]domain[dot]com". The term "tumbling" when used alone will refer to alias tumbling, dot tumbling, and/or other type of tumbling.

Tumbling is oftentimes used illegitimately by malicious actors by creating multiple tumbled email addresses, making it appear as though the tumbled email address is unique. Thus, malicious actors may appear to create multiple user email addresses from a single email address. The detumbling and pre-processing subsystem 120 may detumble a given email address to identify a mailbox from the detumbled email address by removing the tumbling characters. A mailbox is a unique address to which all emails addressed to associated tumbled email addresses are delivered.

Feature Selection and Model Training

The feature selection subsystem 130 may access data from the data sources 101, generate features based on the data, and identify features that are associated with email classifications. For example, known email addresses may be labelled with a risk or non-risk label. The email addresses and their associated features may be analysed to identify which of the features are correlated with the labels. In this way, the feature selection subsystem 130 may identify which features correlate with the labels. In other words, the feature selection subsystem 130 may identify features that likely can be used to predict whether a given input email address is risky or not risky and therefore classify that email address.

The model training subsystem 140 may train a plurality of Release Candidate (RC) models based on respective sets of features and/or parameters such as hyperparameters. The RC models may then be evaluated according to various model performance criteria and the email classification model 142 (and their corresponding features and/or parameters) may be selected from among one or more top N performing RC models for classifying email addresses.

Figure 2:
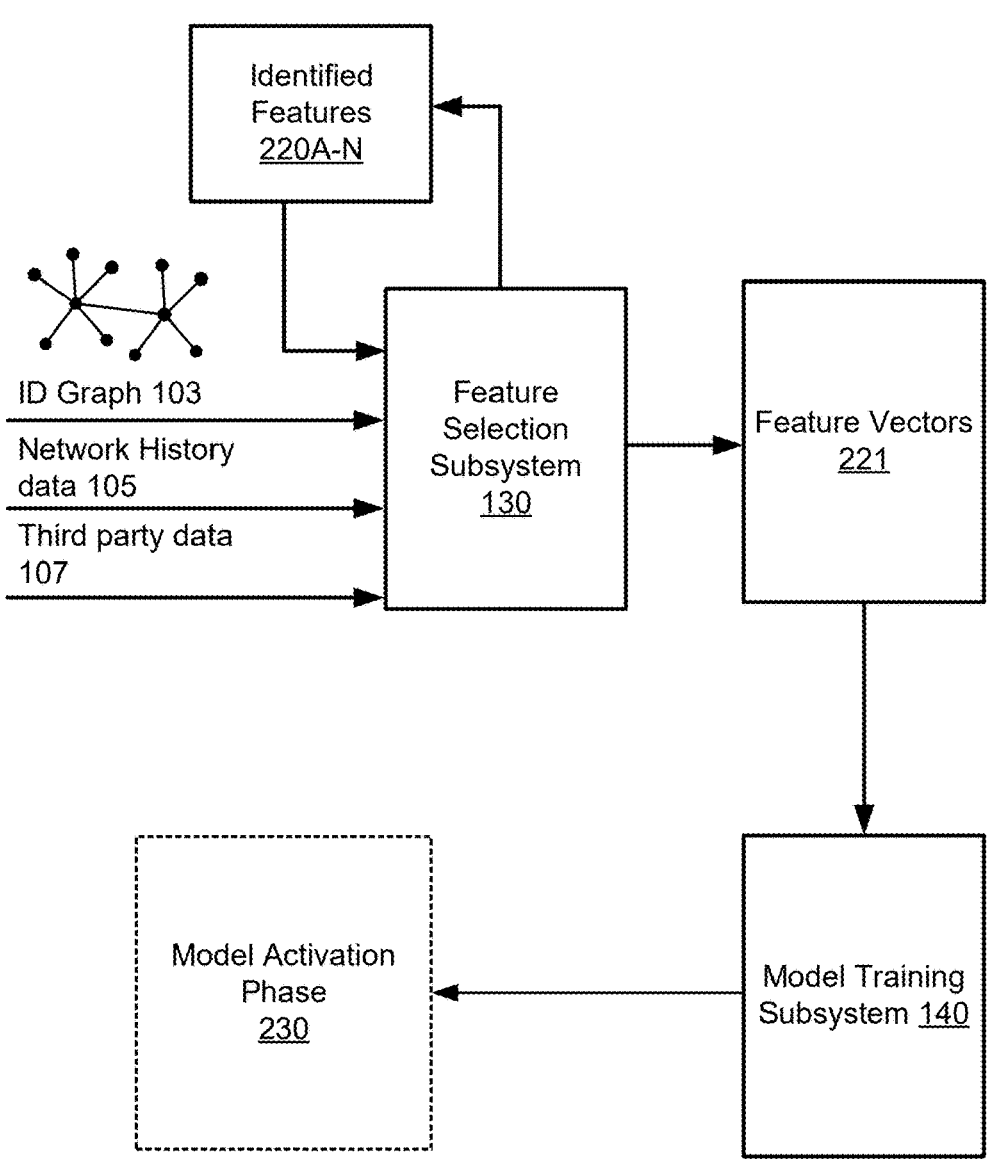
FIG. 2 illustrates an example of training an email classification model.

For example, FIG. 2 illustrates an example of training an email classification model 142 (through RC models training, evaluation, and selection). The feature selection subsystem 130 may access training data, which may include an identity graph 103, network history data 105, and third party data 107.

To identify features 220 that should be included in a Release Candidate (RC) model, the feature selection subsystem 130 may include down-sampling and/or rebalancing email domains, which may improve performance for obfuscated emails (such as Private Relay), determining various threshold values for different features (such as threshold number of days for when an email is considered "recent"), and/or other processes to evaluate candidate features for feature selection. An example of identified features 220 are illustrated in Table 1, followed by a description of down-sampling/rebalancing email domains, improving performance for obfuscated emails (e.g., Apple Private Relay), determining various threshold values for different features, and hyperparameter tuning.

| Feature | Type | Values range | description | Input | Data Source |
|---|---|---|---|---|---|
| domain___by___day___template___first_seen | numeric | nonpositive till −1095 or missing | Number of days since the domain was seen for the first time in the network history data 105 | domain | network history |
| domain___by___day___template___num_good_tx___include___wp_outcome | numeric | nonnegative till −12 or missing | Number of quarters since the domain was accepted (label was positive) in network history prior to the current transaction | domain | network history |
| domain___by___day___template___volatility_30___include___aggregated_country_code | numeric | nonnegative or missing | Number of distinct countries in the past 30 days, when domain was seen in the network history data 105 | domain | network history |
| email___by___day___template___cusum_90_14 | numeric | nonnegative or missing | The maximum number of transactions with the given email that exceeds the 3 month average in the last two weeks. The goal of this feature is to capture the sudden increase in activity for an email | email | network history |
| email___by___day___template___first_seen | numeric | nonpositive till −1095 or missing | Number of days since the email was seen for the first time in the network history data 105 | email | network history |
| email___by___day___template___frequency_913 | numeric | nonnegative or missing | Number of transactions in the past 913 days, when the email was seen in the network history data 105 | email | network history |
| email___by___day___template___frequency_180 | numeric | nonnegative or missing | Number of transactions in the past 180 days, when the email was seen in the network history data 105 | email | network history |
| email___by___day___template___frequency_90 | numeric | nonnegative or missing | Number of transactions in the past 90 days, when the email was seen in the network history data 105 | email | network history |
| email___by___day___template___last_seen | numeric | nonpositive till −1095 or missing | Number of days since the email was seen for the last time in the network history data 105 | email | network history |
| email___by___day___template___num_good_tx___include___wp_outcome | numeric | nonnegative till −12 or missing | Number of quarters since the email was accepted (label was positive) in network history prior to the | email | network history |

-continued

| Feature | Type | Values range | description | Input | Data Source |
|---|---|---|---|---|---|
| | | | current transaction | | |
| email___by___day___ template___popularity_ 90___include___datasource_id | numeric | nonnegative or missing | Number of distinct datasources(customers) in the past 90 days, when the email was seen in the network history data 105 | email | network history |
| email___by___day___ template___rel_weekend_ frequency__913 | numeric | nonnegative or missing | Relative frequency of transactions in the past 2.5 years, when the email was seen on weekends compared to all days (frequency on weekends compared to total frequency in the last 2.5 years) | email | network history |
| email___by___day___template___ volatility__90___ include___billing_ address | numeric | nonnegative or missing | Number of distinct primary addresses in the past 90 days, when the email was seen in the network history data 105 | email | network history |
| email___by___day___template___ volatility__90___ include___billing_ phone | numeric | nonnegative or missing | Number of distinct primary phones in the past 90 days, when the email was seen in the network history data 105 | email | network history |
| email___by___day___template___ volatility__90___ include___ip | numeric | nonnegative or missing | Number of distinct IP addresses in the past 90 days, when email was seen in the network history data 105 | email | network history |
| email___by___day___template___ volatility__90___ include___name | numeric | nonnegative or missing | Number of distinct names in the past 90 days, when email was seen in the network history data 105 | email | network history |
| email___by___day___ template___volatility__90___ include___shipping_ address | numeric | nonnegative or missing | Number of distinct secondary addresses in the past 90 days, when email was seen in the network history data 105 | email | network history |
| email___by___day___template___ volatility__90___ include___shipping_ phone | numeric | nonnegative or missing | Number of distinct secondary phones in the past 90 days, when email was seen in the network history data 105 | email | network history |

-continued

| Feature | Type | Values range | description | Input | Data Source |
|---|---|---|---|---|---|
| email___by___realtime___ template___frequency | numeric | nonnegative or missing | Number of transactions with this email within the past 24 hours in the network history data 105 | email | network history |
| email_address_checks___ email_domain_ creation_days_static | numeric | nonnegative or missing | The domain creation days calculated from a past static reference date | email | 3rd party provider |
| email_address_checks___ email_first_seen_days | numeric | nonnegative or missing | Number of days since the email was seen for the first time | email | 3rd party provider |
| email_address_checks___ is_autogenerated | boolean | True, False | Is the provided email address autogenerated? | email | logic by others |
| email_address_checks___ is_disposable_v2 | boolean | True, False | Is the provided email address disposable? | email | 3rd part provider |
| email_address_checks___ is_recent_email_ domain | boolean | True, False | The email domain creation date is less than 500 days ago (in which 500 days is a threshold number of days that is a cutoff for when to consider domain creation is recent) | email | 3rd party provider |
| email_address_checks___ is_valid | boolean | True, False | Is the provided email address a valid email address? | email | logic by others |
| email_address_checks___ is_alias_tumbled | boolean | True, False | Is the provided email address alias tumbled? (only available for specific domains) | email | logic by others |
| email_address_checks___ is_dot_tumbled | boolean | True, False | Is the provided email address dot tumbled? (only available for specific domains) | email | logic by others |
| email_address_checks___ nr_persons_connected | numeric | nonnegative or missing | Number of persons the email is connected in the Identity Graph | email | graph feature |
| email_address_checks___ nr_phones_connected | numeric | nonnegative or missing | Number of phone numbers the email is connected in the Identity Graph | email | graph feature |
| mailbox___by___realtime___ template___frequency | numeric | nonnegative or missing | Number of transactions with this mailbox in the past 24 hours in the network history data 105 | mailbox | network history |
| mailbox___by___day___ template___cusum_ 90_14 | numeric | nonnegative or missing | The maximum number of transactions with the given mailbox that exceeds the 3 month average in the last two | mailbox | network history |

-continued

| Feature | Type | Values range | description | Input | Data Source |
|---|---|---|---|---|---|
| | | | weeks. The goal of this feature is to capture the sudden increase in activity in the mailbox. | | |
| mailbox___by___day___template___num__good_tx___include___wp_outcome | numeric | nonnegative till −12 or missing | Number of quarters since the mailbox was accepted (label was positive) in network history prior to that transactions | mailbox | network history |
| mailbox___by___day___template___volatility_90___include___email | numeric | nonnegative or missing | Number of distinct emails in the past 90 days, when mailbox was seen in the network history data 105 | mailbox | network history |
| mailbox___by___day___template___frequency_180 | numeric | nonnegative or missing | Number of transactions in the past 180 days, when mailbox was seen in the network history data 105 | mailbox | network history |
| mailbox___by___day___template___volatility_30___include___aggregated_country__code | numeric | nonnegative or missing | Number of distinct countries in the past 30 days, when mailbox was seen in the network history data 105 | mailbox | network history |

Domain Recency Feature Cutoff

The amount of time since creation of an email domain may be an important feature that indicates whether or not an email address with that email domain is potentially being used illegitimately. Generally speaking, greater amounts of time are less risky than smaller amounts of time (recently created email domains may have been created for illegitimate purposes). However, this assumption requires a threshold value: at what point should the amount of time be considered risky? Based on observations of known data, the threshold value was determined. For example, a threshold value of 500 days resulted in the best performance, as described below.

Figure 7A:
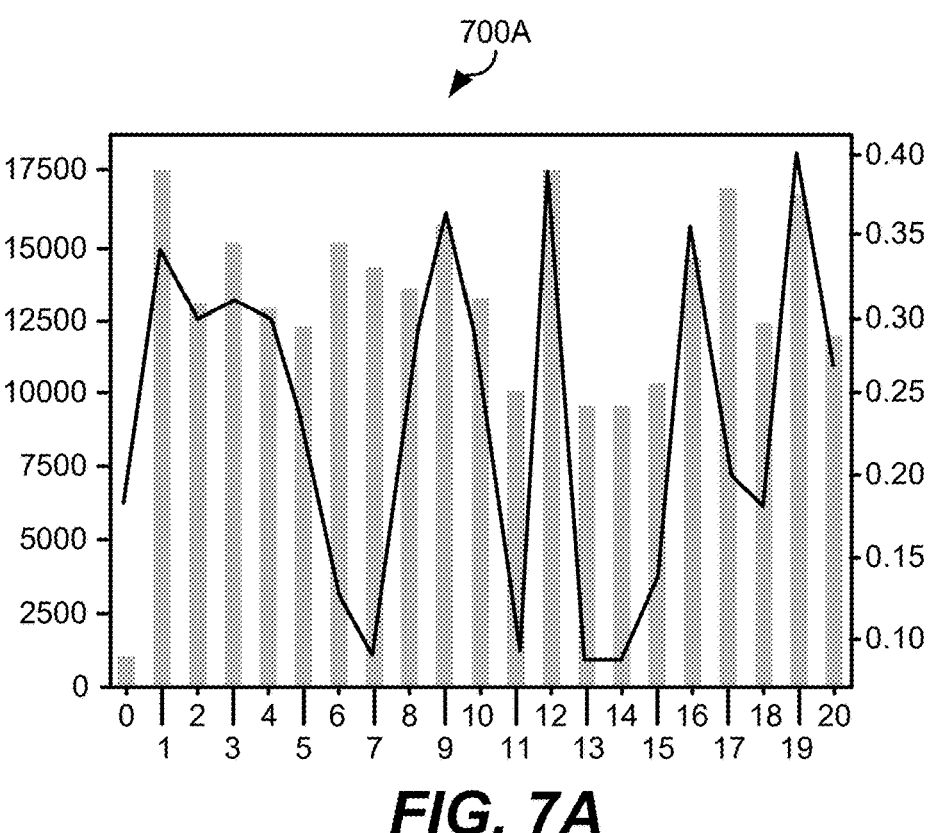
FIG. 7A illustrates an example of a plot of data points for determining a threshold cutoff value for domain recency without domain grouping.

All transactions from the various data sources were plotted, as shown in FIG. 7A, which illustrates an example of a plot 700A of data points for determining a threshold cutoff value for domain recency without domain grouping. In some instances, only domains with less than 2000 days since domain creation were analyzed. Buckets were created in which one bucket corresponded to M days (such as 1 bucket=100 days) and plotted the all transactions with reject rates, indicating that a transaction was rejected and also that the associated email address is was used illegitimately. In some examples, a "rejected transaction" may include a transaction that was initially accepted/approved and later found to be fraudulent. No trend/pattern was identified.

Figure 7B:
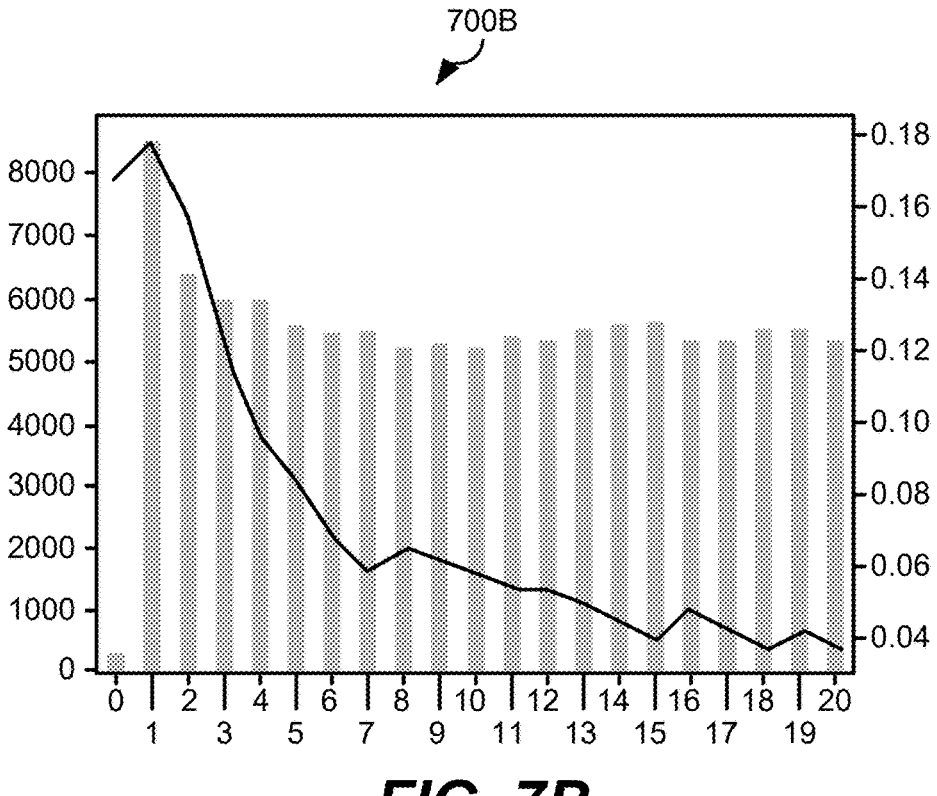
FIG. 7B illustrates an example of a plot of data points for determining a threshold cutoff value for domain recency with domain grouping.

Grouping domains, and plot average values: as a next step, the domains were grouped, as shown in FIG. 7B, which illustrates an example of a plot 700B of data points for determining a threshold cutoff value for domain recency with domain grouping. There are many over-proportional domains and smaller domains. Thus, a table with average/min/max domain creation days and average reject rate was created. A clear pattern was identified.

Table 2 below shows evaluation of different cutoffs: when comparing the results based on different geographic regions, certain regions such as the Asia-Pacific (APAC) region had very diverse AUC depending on the cutoff that was used. When checking the results, 500 days (and 550 days) had the best performance (based on AUC). Therefore, 500 days was selected for the threshold value.

| | Feature | Input 1 | Input 2 | Type | AUC | F1 | Fpr | Count | Rrate |
|---|---|---|---|---|---|---|---|---|---|
| 1 | is_recent_domain_1000 | email | null | Boolean | 0.512 | 0.3522 | 0.5184 | 270959 | 0.2521 |
| 2 | is_recent_domain_1100 | email | null | Boolean | 0.4962 | 0.3443 | 0.5624 | 270959 | 0.2521 |
| 3 | is_recent_domain_500 | email | null | Boolean | 0.5381 | 0.3035 | 0.2453 | 270959 | 0.2521 |
| 4 | is_recent_domain_550 | email | null | Boolean | 0.5269 | 0.3032 | 0.2656 | 270959 | 0.2521 |

-continued

| | Feature | Input 1 | Input 2 | Type | AUC | F1 | Fpr | Count | Rrate |
|---|---|---|---|---|---|---|---|---|---|
| 5 | is_recent_domain_600 | email | null | Boolean | 0.5135 | 0.2987 | 0.3099 | 270959 | 0.2521 |
| 6 | is_recent_domain_800 | email | null | Boolean | 0.4926 | 0.3064 | 0.4224 | 270959 | 0.2521 |

The identified features 220 may be vectorized for training models. For example, the feature selection subsystem 130 may generate feature vectors 221 based on the identified features 220. A feature vector 221 is a list of numbers, where each number (called a component) corresponds to a specific feature or attribute of the data such as a feature value of a feature in Table 1. The length of the list determines the dimensionality of the vector. A vector with two numbers is two-dimensional (2D), three numbers is three-dimensional (3D), and so on. Vectors represent data numerically and may transform complex data into a format machines can understand for training models. In some examples, vectors may encode relationships through vector positions and distances in a high-dimensional space. Similarities and patterns between data points may be determined based on their respective positions in the high-dimensional space relative to one another.

Down-Sampling/Rebalancing Domains

The model training subsystem 140 may improve model performance on a domain level by implementing one or more domain level rebalancing and down-sampling strategies. Rebalancing involves adjusting the distribution of data within each domain. Down-sampling refers to reducing the size of domains, such as large domains greater than a threshold (such as email domains with greater than 50,000 data points (email data points), greater than 10,000 data points, or greater than 5,000 data points).

Rebalancing larger domains and data source (the source of the email data: the customer, which may be identified by the customer's API key) was found to provide the most effective results. For example, rebalancing alone did not show performance improvement, but showed bias transfer from domain to data source. Rebalancing on domain and data source led to general performance slight decreases, performance loss on small domains because the domain reject rate is probably a pattern, domain-level performance increases, fixed distribution for certain domains and pushed to the middle for emails on platforms that use private relay. Rebalancing on large domains had similar performance gains as rebalancing on domain and data source generally, but without performance loss for small domains (such as those having less than 5,000 data points).

Thus, generally speaking, rebalancing on the domain level alone led to a decrease in performance, as indicated by a lower batch AUC (Area Under the Curve, often used to evaluate model performance). Rebalancing on both domain and data source had mixed results: general performance slightly decreased, performance decreased for small domains, possibly because patterns related to domain rejection rates were disrupted, performance improved for the model's ability to predict by domain. The distribution within specific domains and those using private relay was adjusted, reducing bias and/or improving accuracy.

The model training subsystem 140 may train different RCs based on the selected features and hyperparameters. The hyperparameter values may be tuned by optimizing according to performance based on model performance metrics such as ByBatch AUC and highest Weighted Reason Code Clarity (WREC). Highest WREC refers to better explanations of the scores in the training or validation datasets. WREC may be used to check the explainability of a model: a higher WREC indicates that the model is more explainable compared to a lower WREC. For calculating the WREC, the reason codes of the model features may be calculated for all transactions.

For a given transaction, a reason code may be calculated for each model input feature. This is done by 'flipping' the feature value and looking at the new score. Flipping the feature means that when there is a split in the tree on the given feature, the other way/branch is chosen as we would choose based on the original feature value.

Reason code direction is determined as follows. If the new score is higher than the original then we have a positive reason code for the feature, which means that the given feature value in this given transaction is a good sign. In the opposite case, the reason code is negative. If there is no difference in the score there won't be a reason code for the feature.

If a model is interpretable, reason codes for a given feature value should have the mostly same direction in all of the transactions.

Highest ByBatch AUC refers to the highest performance observed within specific batches or subsets of the data. By analyzing the AUC on a per-batch basis, particular segments or subsets of the data for which the model is performing relatively worse compared to others may be identified. This insight can be valuable for identifying patterns or issues within the data or the model itself, allowing for targeted improvements or adjustments. Table 3 illustrates an example of a set of tuned training parameters:

```
"training": {
  "workers": 24,
  "rounds": 400,
  "xgBoostParams": {
    "trainTestRatio": 0.95,
    "eta": 0.11,
    "maxDepth": 4,
    "scalePosWeight": 9,
    "gamma": 3,
    "minChildWeight": 1000,
    "maxDeltaStep": 0,
    "subsample": 0.65,
    "colsampleBytree": 0.5,
    "colsampleBylevel": 1,
    "lambda": 0,
    "alpha": 0.11,
    "objective": "binary:logistic",
    "evalMetric": "auc",
    "treeMethod": "approx",
    "sketchEps": 0.03
  }
}
```

Training Parameters

Workers: This parameter typically refers to the number of parallel threads or processes used during training. In this case, it's set to 24, meaning that the training process will utilize 24 workers to expedite the training process.

Rounds: This specifies the number of boosting rounds or iterations during the training process. In this example, the number of rounds is set to 400, meaning the algorithm will go through the training data four hundred times to iteratively improve the model.

The "xgBoostParams" section shows specific parameters for Extreme Gradient Boosting (XGBoost) training.

trainTestRatio: This parameter indicates the ratio of training data to testing data. A value of 0.95 suggests that 95% of the data will be used for training and 5% for testing.

eta: Also known as learning rate, it controls the step size at each iteration while moving toward a minimum of the loss function. A lower value usually means slower learning but potentially better convergence.

maxDepth: This parameter defines the maximum depth of a tree. A depth of 4 means each tree can have a maximum of 4 levels.

scalePosWeight: This is a parameter to control the balance of positive and negative weights, set to 9, which may mitigate imbalanced classes.

gamma: Regularization parameter. It encourages pruning of the tree by penalizing the number of additional splits. A higher value means more regularization.

minChildWeight: Minimum sum of instance weight (hessian) needed in a child. Used to control over-fitting. A higher value means more conservative, avoiding splitting when the sum of the instance weight is below this value.

maxDeltaStep: Maximum delta step we allow each tree's weight estimation to be. It helps make the update step more conservative.

subsample: Subsample ratio of the training instance. This is the ratio of the training data to be used for each boosting round. Smaller values make the algorithm more conservative and prevents overfitting.

colsampleBytree: Subsample ratio of columns (features) when constructing each tree.

colsampleBylevel: Subsample ratio of columns for each level.

lambda: L2 regularization term on weights. Increasing this value will make model more conservative.

alpha: L1 regularization term on weights. Increasing this value will make model more conservative.

objective: The learning objective, which is set to "binary: logistic" which means XGBoost will be used for binary classification and output probabilities.

evalMetric: The evaluation metric to be used, which is set to "auc" which stands for Area Under the Curve. It's often used for binary classification problems to evaluate the model's performance.

treeMethod: The method to use for tree construction, which is set to "approx" which indicates approximate greedy algorithm.

sketchEps: Parameter for approximate greedy algorithm.

The model training subsystem 140 may train the email classification model 142 (or RC models that are evaluated, selected and then used as a email classification model 142) using an eXtreme Gradient Boosting (XGBoost). Gradient boosting is a machine learning technique for regression and classification problems, which produces a prediction model in the form of an ensemble of weak prediction models, typically decision trees. Gradient boosting may build a model in a stage-wise fashion and generalizes the model by allowing optimization of an arbitrary differentiable loss function. Gradient boosting may operate on categories/subcategories of features, making it suited for the features described herein. XGBoost is an ensemble learning algorithm, in which predictions of multiple models are combined to create a more robust and accurate final prediction. These individual models are often called "weak learners". XGBoost builds an ensemble of models in a step-by-step manner. At each step, it focuses on correcting the errors made by the previous models. XGBoost may use gradient descent to optimize the performance during training.

During training, in some examples, XGBoost learns to map feature vectors to a probability of risk by constructing an ensemble of decision trees. In the transaction examples, the output may be a probability of fraud (probability that the email address is associated with fraud). XGBoost builds an ensemble of decision trees sequentially. Each tree is trained to correct the errors of the previous one. Decision trees are a set of rules that split the data based on feature values (such as those listed in Table 1) to make predictions. XGBoost employs gradient boosting, which means each tree is trained to minimize the residual errors (the differences between predicted and actual values) from the previous tree.

XGBoost optimizes a predefined objective function during training. For classification tasks, the objective function typically measures the difference between predicted and actual class labels, such as labels indicate riskiness. For example, the objective function aims to minimize the errors in predicting the riskiness of email addresses based on the provided features. XGBoost selects the best feature and split point at each node of the decision trees to maximize the reduction in the objective function. For example, XGBoost would evaluate different split points for features like the number of people associated with the email address, the age of the email address domain, and the recentness of when the last email address was last seen.

XGBoost includes regularization techniques to prevent overfitting, which occurs when the model learns to memorize the training data rather than generalize to unseen data. Regularization parameters control the complexity of the decision trees and penalize large coefficients, helping to ensure a more robust and generalizable model. XGBoost employs tree pruning techniques to remove unnecessary branches of the decision trees, reducing their complexity and preventing overfitting. Pruning ensures that the ensemble of trees remains interpretable and efficient while maintaining high predictive performance. XGBoost updates the model's parameters (weights or coefficients) using gradient descent optimization. It calculates the gradients of the objective function with respect to the model's predictions and adjusts the model's parameters in the direction that minimizes the objective function.

Once the email classification model 142 is trained with selected features and tuned parameters, during a model activation phase 230, the email classification model 142 may generate an output that indicates a probability of riskiness of an input email address. The probability of riskiness may represent a likelihood that the input email address is associated with illegitimate uses. Risk assessment (such as "high risk", "medium risk" and "low risk") based on the probability may be performed by analyzing the distribution and reject rates of model scores in different regions. Other risk labels and ranges may be used as well or instead.

The region threshold estimation subsystem 150 may estimate the risk ranges for each risk label. It has been discovered that modelling may be improved by assigning risk ranges per geographic location. This is because some geographic regions may exhibit more riskiness than others. The region threshold estimation subsystem 150 may enable threshold selection of email risk. For example, threshold ranges may be adjusted based on geographic regions associated with emails. To illustrate, a high risk threshold range may be weighted upward such that an output of the email classification model 142 that would be placed in the high risk class prior to adjusting is no longer placed in the high risk class after adjusting. This adjustment scheme may take into account the different risk levels of different regions (for example, APAC regions may be associated with higher risk email addresses generally and therefore threshold ranges for the APAC region may be adjusted upward to make it harder for a given risk output to fall within the high risk threshold range). This adjusted risk threshold may mitigate against overfitting for higher risk regions and under-fitting for lower risk regions.

| | non APAC countries and AU, NZ, HK, SG from APAC from which emails are associated/originated | APAC countries from which emails are associated/originated |
|---|---|---|
| LOW THRESHOLD | 0.81 | 0.88 |
| HIGH THRESHOLD | 0.975 | 0.985 |

When applying the same threshold on the whole data, some countries had very high ratio of transactions in the HIGH risk category. For example, Table 5 shows examples of countries of the APAC segment showing high risk:

| RISK | aggregated_country_code | count | cnt_group | pct |
|---|---|---|---|---|
| HIGH | ID | 259310 | 489988 | 0.5292 |
| HIGH | PK | 17520 | 44466 | 0.394 |
| HIGH | TH | 69087 | 182402 | 0.3788 |

| | Cluster_k2 | Region_country | Aggregated_country_code |
|---|---|---|---|
| 1 | 0 | APAC | ["JP," "ID", "MY", "PH", "VN", "PK", "TW", "KR", "LK", "IN", "CN", "BD", "AF", "BN", "KH", "NP", "NC"] |
| 2 | 0 | EMEA | ["IT", "PL", "HU", "RO", "GR", "CZ", "AT", "NG", "AE", "MA", "TR", "ZA", "BG", "LT", "SA", "HR", "FI", "LV", "SI", "SK", "EE", "TN", "CY", "EG", "QA", "MK", "RS", "BA", "AZ", "BY", "KW", "ME", "DZ", "IS", "MD", "RU", "MU", "BH", "GE", "JO", "RE", "OM", "IQ", "KZ", "GH", "KE", "PS", "FO", "AM", "ZW", "TZ", "UZ", "SN"] |
| 3 | 0 | Latam | ["BR", "CL", "AR", "PE", "EC", "CR", "SV", "MQ", "GP", "HN", "UY", "VE", "GT", "PY", "GF", "BS", "NI"] |
| 4 | 0 | NA | ["GL"] |
| 5 | 1 | APAC | ["AU", "SG", "HK", "NZ"] |
| 6 | 1 | EMEA | ["GB", "FR", "DE", "ES", "UA", "SE", "IE", "BE" "NL", "CH", "DK", "PT", "NO", "IL", "MT", "AL", "LU", "GI", "IM", "LB", "JE", "GG", "BJ", "CI"] |
| 7 | 1 | Latam | [MX", "CO", "BB", "DO", "JM", "PA", "PR"] |
| 8 | 1 | NA | ["US", "CA"] |

-continued

| RISK | aggregated_country_code | count | cnt_group | pct |
|---|---|---|---|---|
| HIGH | CN | 5422 | 32089 | 0.169 |
| HIGH | TW | 6839 | 43651 | 0.1567 |

It was discovered that some of the APAC countries have different patterns of emails. Thus, the is_autogenerated flag is more often TRUE for some APAC countries than for other countries. Likewise, the is_disposable flag is more often TRUE for some APAC countries than for other countries. Additionally, the coverage is also worse than in other countries. The TRUE value of is_autogenerated and is_disposable flag increases the email risk score, as seen in the plots below.

Identifying Different Country Groups

To be able to identify the different patterns in the countries, the 3DS validation set (that included much diverse data the training/validation sample, with more datasources also in APAC countries) was used. Three features in particular were analyzed:

average of is_autogenerated flag in a given country
    average of is_diposable flag in a given country
    coverage of email first seen in a given country Using these features, cluster analysis on the countries was conducted. Two groups based on these attributes were created: cluster 1 includes mostly more developed countries. Two different clusters were analyzed (cluster 0 for less developed countries and cluster 1 for more developed countries). Three groupings of countries were then analyzed.

only APAC countries from cluster 0 was handled differently, all other regions were in cluster 1 cluster 0 and 1 splitted according to cluster analysis only Latam and APAC countries from cluster 0 were handled differently (other countries were assigned to cluster 1)

The same threshold was applied in as many locations without very fine thresholds since only problematic regions such as APAC were targeted for threshold adjustment/ selection. Three different approaches when selecting thresholds:

volume based
    reject rate based
    focusing on reject rate, volume and F1

The reject rate based approach was selected for the APAC clustering. In this case, threshold values are closer to each other (than in other approaches), reject rates are more balanced. However, there is a large difference in the distribution, with APAC countries having more transactions in the HIGH and mainly in the MEDIUM risk categories than non-APAC countries.

Figure 3:
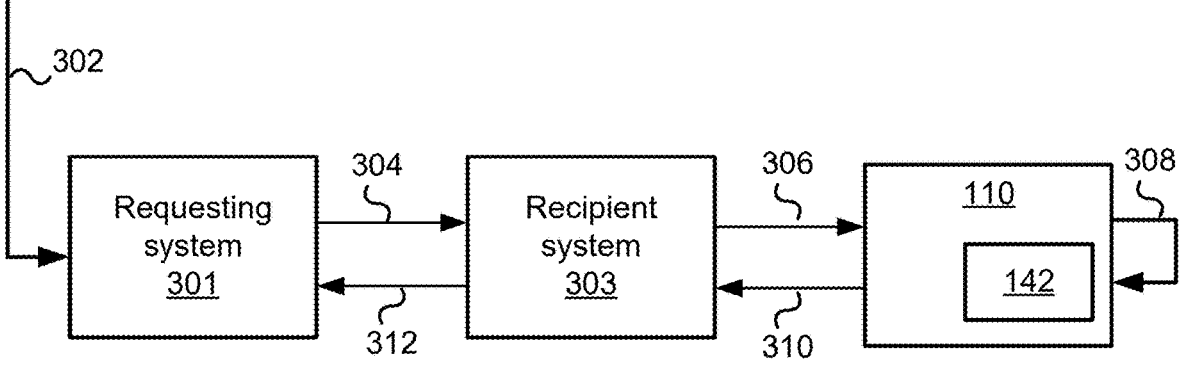
FIG. 3 illustrates an example of executing the email classification model.

FIG. 3 illustrates an example of executing the email classification model. At 302, an email address may be provided to a requesting system 301. The requesting system 301 may be a merchant or other entity that wishes to assess the riskiness of the provided email address. The email address may be provided by a user at a brick-and-mortar merchant or may be provided via a network such as an online retail site. The email address may be provided in connection with other contexts, in which case the requesting system 301 may be an entity other than a merchant.

At 304, the requesting system 301 may transmit the email address for assessment to a recipient system 303. Continuing the foregoing example, the recipient system 303 may be a card payment network. The email address may be provided in connection with other contexts, in which case the requesting system 301 may be an entity other than a payment network.

At 306, the recipient system 303 may request an email assessment from the computer system 110. It should be noted that the recipient system 303 may operate and/or house the computer system 110. Alternatively, the computer system 110 may be operated by another entity or otherwise be housed separately from the recipient system 303.

At 308, the computer system 110 may generate an email address classification by executing the email classification model 142, which may generate an output ranging from 0.0-1.0, in which 0 represents no risk and 1 represents maximum risk, or vice versa depending on the labels used to train the email classification model 142. The output may be converted to classification labels such as low risk, medium risk, or high risk depending on threshold ranges associated with each classification label. Each of these threshold ranges may be regionally-adjusted. At 310, the computer system 110 may transmit the score and/or classification back to the recipient system 303.

At 312, the recipient system 303 may transmit a response back to the requesting system 301. In some implementations, the response includes the score and/or the classification, in which case the requesting system 301 will take any mitigative action depending on the score and/or the classification. Alternatively, any mitigative action, such as declining a transaction because the risk of the email address is too high based on risk threshold values that the requesting system 301 (such as the merchant) may have configured. In these examples, the transaction response message may include a reason code for the declined transaction (in this case that the provided email address exceeded the risk threshold). On the other hand, if the risk was acceptable based on the risk threshold value, then the transaction may be approved, in which case the response at 312 will indicate such approval.

FIG. 4 illustrates an example of a method 400 of generating an email classification. At 402, the method 400 may include accessing an email address. At 404, the method 400 may include generating a plurality of features based on the email address. The plurality of features may include some or all of the features listed in Table 1. For example, the plurality of features may include an identity-graph based feature that indicates a number of identity data points associated with the email address, an email tumbling based feature that indicates whether the email address has been tumbled, and a domain-based feature that indicates a recency of a domain associated with the email address. At 406, the method 400 may include vectorizing the plurality of features to generate a feature vector. At 408, the method 400 may include executing, based on the feature vector, an email classification model comprising an ensemble machine learning model trained to classify email addresses according to the plurality of features of email addresses in training data and classification labels associated with the email addresses. At 410, the method 400 may include determining, based on execution of the email classification model, a classification of the email address, the classification being actionable to take a remedial action responsive to the classification.

FIG. 5 illustrates an example of a method 500 of training an email classification model 142. At 502, the method 500 may include access training data comprising a plurality of electronic mail (email) addresses, each email address being associated with a respective label that indicates a class to which the email address belongs. At 504, the method 500 may include rebalancing the training data based on a domain and a data source associated with each of the plurality of email addresses. At 506, the method 500 may include determining a threshold value for each of one or more features. For example, explorative data analysis may be performed on the features (such as the recent domain feature) and the threshold value may be determined based on this analysis (such as to determine which domain is recent based on the threshold value for the recent domain feature). At 508, the method 500 may include identifying a plurality of candidate features based on the rebalanced training data. At 510, the method 500 may include training a plurality of Release Candidate (RC) models based on the plurality of features, wherein each RC model is trained to classify an email address into a class corresponding to a respective label.

Figure 6:
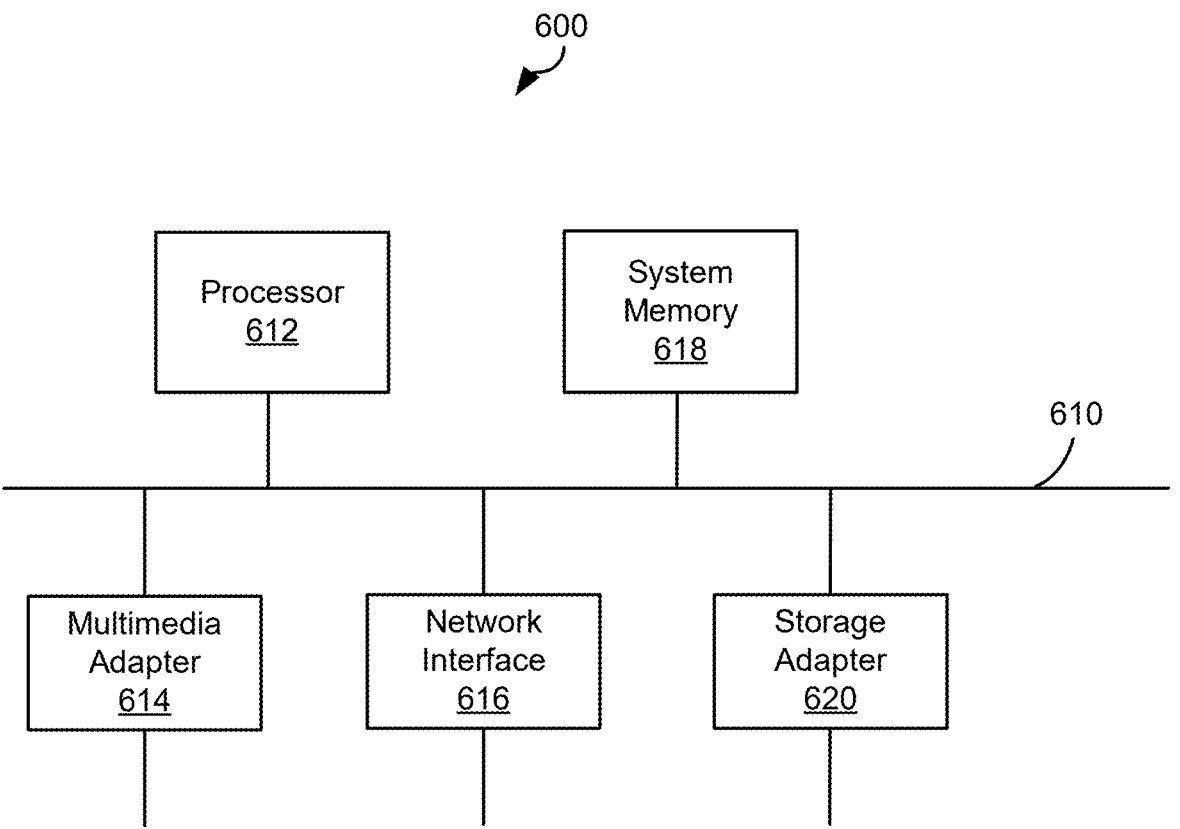
FIG. 6 illustrates an example of a computer system that may be implemented by devices illustrated in FIG. 1.

FIG. 6 illustrates an example of a computer system 600 that may be implemented by devices illustrated in FIG. 1. The computer system 600 may be part of or include the system environment 100 to perform the functions and features described herein. For example, various ones of the devices of system environment 100 may be implemented based on some or all of the computer system 600. The computer system 600 may include, among other things, an interconnect 610, a processor 612, a multimedia adapter 614, a network interface 616, a system memory 618, and a storage adapter 620.

The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 610 may allow data communication between the processor 612 and system memory 618, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may control operations of the computer system 600. In some examples, the processor 612 may do so by executing instructions such as software or firmware stored in system memory 618 or other data via the storage adapter 620. In some examples, the processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 616 may provide the computer system 600 with an ability to communicate with a variety of remote devices over a network. The network interface 616 may include, for example, an Ethernet adapter, a Fibre Channel adapter, and/or other wired- or wireless-enabled adapter. The network interface 616 may provide a direct or indirect connection from one network element to another, and facilitate communication to and between various network elements. The storage adapter 620 may connect to a standard computer readable medium for storage and/or retrieval of information, such as a fixed disk drive (internal or external).

Other devices, components, elements, or subsystems (not illustrated) may be connected in a similar manner to the interconnect 610 or via a network. The devices and subsystems can be interconnected in different ways from that shown in FIG. 8. Instructions to implement various examples and implementations described herein may be stored in computer-readable storage media such as one or more of system memory 618 or other storage. Instructions to implement the present disclosure may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

"Artificial intelligence" refers to is a branch of computer science focused on training computer models via machine learning techniques to perform tasks, such as email address classification. Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "101A-N" does not refer to a particular number of instances of 101A-N, but rather "two or more."

The databases (such as the model database 113, which may store model features, parameters, hyperparameters, and/or other data related to training or executing the email classification model 142) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independently and separate from other components and processes described herein. Each component and process may also be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

a hardware processor programmed to:

access an electronic mail (email) address;

generate a plurality of features based on the email address, the plurality of features comprising an identity-graph based feature that indicates a number of identity data points associated with the email address, an email tumbling based feature that indicates whether the email address has been tumbled, and a domain-based feature that indicates a recency of a domain associated with the email address;

vectorize the plurality of features to generate a feature vector;

execute, based on the feature vector, an email classification model comprising an ensemble machine learning model trained to classify email addresses according to the plurality of features of email addresses in training data and classification labels associated with the email addresses; and determine, based on execution of the email classification model, a classification of the email address, the classification being actionable to take a remedial action responsive to the classification.

2. The system of claim 1, wherein to determine the classification, the hardware processor is further programmed to:

evaluate an output of the email classification model against a plurality of threshold ranges, each threshold range from among the plurality of threshold ranges being associated with a respective class; and assign the output to the classification based on the evaluation.

3. The system of claim 2, wherein each of the plurality of threshold ranges is adjusted upward or downward according to a regional risk, and wherein the hardware processor is further programmed to:

identify a region associated with the email address;

identify a plurality of threshold ranges to apply based on the region; and evaluate an output of the email classification model against the identified plurality of threshold ranges, each threshold range from among the plurality of threshold ranges being associated with a respective class; and assign the output to the classification based on the evaluation.

4. The system of claim 3, wherein the plurality of threshold ranges was adjusted upward or downward based on a riskiness of the region.

5. The system of claim 1, wherein the hardware processor is further programmed to:

detumble the email address to identify a mailbox; and link the detumbled email address with the mailbox.

6. The system of claim 1, wherein the hardware processor is further programmed to train the email classification model to identify a riskiness of an email address.

7. The system of claim 6, wherein to train the email classification model, the hardware processor is further programmed to:

determine a threshold number of days that is a cutoff for when to consider domain creation is recent; and generate the domain-based feature based on the threshold number of days.

8. The system of claim 6, wherein to train the email classification model, the hardware processor is further programmed to:

rebalance data in training data for domains having greater than a threshold number of data points.

9. The system of claim 6, wherein to train the email classification model, the hardware processor is further programmed to:

evaluate, based on one or more model performance criteria, a plurality of Release Candidate (RC) models each trained on respective sets of features and/or parameters; and select one or more top performing RC models for classifying email addresses.

10. The system of claim 6, wherein to train the email classification model, the hardware processor is further programmed to:

identify one or more candidate features based on downsampled email domains, rebalanced email domains, one or more threshold values for features, and/or hyperparameter tuning;

evaluate performance of models trained from the one or more candidate features; and select the plurality of features based on the performance of the models.

11. A method, comprising:

accessing, by a processor, an electronic mail (email) address;

generating, by the processor, a plurality of features based on the email address, the plurality of features comprising an identity-graph based feature that indicates a number of identity data points associated with the email address, an email tumbling based feature that indicates whether the email address has been tumbled, and a domain-based feature that indicates a recency of a domain associated with the email address;

vectorizing, by the processor, the plurality of features to generate a feature vector;

executing, by the processor, based on the feature vector, an email classification model comprising an ensemble machine learning model trained to classify email addresses according to the plurality of features of email addresses in training data and classification labels associated with the email addresses; and determining, by the processor, based on execution of the email classification model, a classification of the email address, the classification being actionable to take a remedial action responsive to the classification.

12. The method of claim 11, wherein determining the classification comprises:

evaluating an output of the email classification model against a plurality of threshold ranges, each threshold range from among the plurality of threshold ranges being associated with a respective class; and assigning the output to the classification based on the evaluation.

13. The method of claim 12, wherein each of the plurality of threshold ranges is adjusted upward or downward according to a regional risk, the method further comprising:

identifying a region associated with the email address;

identifying a plurality of threshold ranges to apply based on the region; and evaluating an output of the email classification model against the identified plurality of threshold ranges, each threshold range from among the plurality of threshold ranges being associated with a respective class; and assigning the output to the classification based on the evaluation.

14. The method of claim 13, wherein the plurality of threshold ranges was adjusted upward or downward based on a riskiness of the region.

15. The method of claim 11, the method further comprising:

detumbling the email address to identify a mailbox; and
  linking the detumbled email address with the mailbox.

16. The method of claim 11, wherein the processor is further programmed to train the email classification model to identify a of an email address.

17. The method of claim 16, wherein training the email classification model comprises:

determining a threshold number of days that is a cutoff for when to consider domain creation is recent; and
  generating the domain-based feature based on the threshold number of days.

18. The method of claim 16, wherein training the email classification model comprises:

rebalancing data in training data for domains having greater than a threshold number of data points.

19. A non-transitory computer-readable medium storing instructions, the instructions, when executed by a processor, programs the processor to:

access training data comprising a plurality of electronic mail (email) addresses, each email address being associated with a respective label that indicates a class to which the email address belongs;
  rebalance the training data based on a domain and a data source associated with each of the plurality of email addresses;
  determine a threshold value for each of one or more features;
  identify a plurality of candidate features based on the rebalanced training data; and
  train a plurality of Release Candidate (RC) models based on the plurality of features, wherein each RC model is trained to classify an email address into a class corresponding to a respective label.

20. The non-transitory computer-readable medium of claim 19, wherein the instructions when executed by the processor further program the processor to:

evaluate, based on one or more model performance criteria, the plurality of RC models; and
  select one or more top performing RC models for classifying email addresses.

\* \* \* \* \*